United States Patent
Rajwade et al.

(10) Patent No.: US 10,424,963 B1
(45) Date of Patent: Sep. 24, 2019

(54) METHODS AND SYSTEMS FOR CHARGING A BACKUP BATTERY PACK

(71) Applicant: Cooper Technologies Company, Houston, TX (US)

(72) Inventors: Yash Sanjay Rajwade, Raleigh, NC (US); Kevin O. Porter, Peachtree City, GA (US); James Christopher Andrews, Mableton, GA (US)

(73) Assignee: Eaton Intelligent Power Limited, Dublin (IE)

( * ) Notice: Subject to any disclaimer, the term of this patent is extended or adjusted under 35 U.S.C. 154(b) by 67 days.

(21) Appl. No.: 15/414,048

(22) Filed: Jan. 24, 2017

Related U.S. Application Data

(60) Provisional application No. 62/296,927, filed on Feb. 18, 2016.

(51) Int. Cl.
*H02J 9/00* (2006.01)
*H02J 9/04* (2006.01)
*H02J 7/00* (2006.01)

(52) U.S. Cl.
CPC .............. *H02J 9/04* (2013.01); *H02J 7/0021* (2013.01); *H02J 7/0073* (2013.01)

(58) Field of Classification Search
CPC ........... H02J 7/0073; H02J 7/0021; H02J 9/04
See application file for complete search history.

(56) References Cited

U.S. PATENT DOCUMENTS

| | | | | |
|---|---|---|---|---|
| 3,636,404 A | * | 1/1972 | Appleton | H02J 9/02 250/206 |
| 4,065,676 A | * | 12/1977 | Elias | H02H 3/46 307/66 |
| 4,251,883 A | * | 2/1981 | Grants | G05B 19/058 361/92 |
| 4,286,204 A | * | 8/1981 | Belot | H02J 7/0078 307/66 |
| 4,560,886 A | * | 12/1985 | Ferguson | H02J 9/062 307/48 |
| 5,254,930 A | * | 10/1993 | Daly | H02J 7/0026 320/119 |
| 5,532,523 A | * | 7/1996 | Tang | H02J 9/062 307/64 |
| 5,541,829 A | * | 7/1996 | Maehara | H02M 7/5236 363/34 |
| 5,635,816 A | * | 6/1997 | Welsh | H02J 7/35 136/293 |

(Continued)

*Primary Examiner* — Naum Levin
(74) *Attorney, Agent, or Firm* — King & Spalding LLP

(57) ABSTRACT

An electrical circuit can include a power supply that provides primary power, and an electrical load coupled to the power supply. The electrical circuit can also include an energy storage unit coupled to the power supply and the electrical load. The energy storage unit can include at least one energy storage device that stores reserve power using the primary power, and a first switch disposed between the power supply and the at least one energy storage device. The energy storage unit can also include a controller that operates the first switch from a closed position to an open position after a first amount of time. The at least one energy storage device can receive the primary power when the first switch is in the closed position. The at least one energy storage device can fail to receive the primary power when the first switch is in the open position.

18 Claims, 8 Drawing Sheets

(56) References Cited

U.S. PATENT DOCUMENTS

| | | | |
|---|---|---|---|
| 5,933,812 A * | 8/1999 | Meyer | G06Q 20/20 235/380 |
| 6,286,127 B1 * | 9/2001 | King | G05B 19/07 327/54 |
| 6,492,792 B1 | 12/2002 | Johnson | |
| 6,590,786 B2 * | 7/2003 | Gurov | H02M 3/33592 363/16 |
| 6,677,730 B2 * | 1/2004 | Bedini | H02J 7/0052 320/139 |
| 6,737,832 B2 * | 5/2004 | Uchida | H02J 1/04 320/138 |
| 6,864,669 B1 * | 3/2005 | Bucur | H02J 7/0013 307/48 |
| 7,026,726 B2 * | 4/2006 | Shiojima | H02J 9/061 307/66 |
| 7,405,953 B2 * | 7/2008 | Nakamura | H02M 1/38 363/21.12 |
| 7,547,990 B2 * | 6/2009 | Varzhabedian | H02J 7/027 307/66 |
| 7,622,898 B2 * | 11/2009 | Shimizu | H02J 7/0016 320/166 |
| 7,759,900 B2 * | 7/2010 | Samstad | H02J 7/0052 307/66 |
| 7,804,273 B2 | 9/2010 | Popescu-Stanesti | |
| 7,816,889 B2 | 10/2010 | Yang | |
| 7,872,373 B2 * | 1/2011 | Henkel | H02J 9/06 307/64 |
| 8,072,187 B2 * | 12/2011 | Wu | H02J 7/0008 307/46 |
| 8,213,203 B2 * | 7/2012 | Fei | H02M 3/33523 323/285 |
| 8,362,647 B2 * | 1/2013 | Anderson | H02J 9/04 307/64 |
| 8,378,596 B2 * | 2/2013 | Ayres | H05B 33/0854 315/151 |
| 8,629,631 B1 * | 1/2014 | Rhodes | H02M 1/36 315/227 R |
| 8,689,032 B2 * | 4/2014 | Kurahashi | H02J 7/0073 713/300 |
| 9,083,180 B2 * | 7/2015 | Dodal | H02H 3/16 |
| 9,143,005 B1 * | 9/2015 | Laird | H02J 9/00 |
| 9,203,265 B2 * | 12/2015 | Alappat | H02J 7/345 |
| 9,356,470 B2 * | 5/2016 | Yamamoto | H02J 3/387 |
| 9,692,297 B2 * | 6/2017 | Archibald | H02M 3/156 |
| 9,812,901 B2 * | 11/2017 | Descarries | H02J 9/065 |
| 9,871,388 B2 * | 1/2018 | Nakamura | H02J 7/0013 |
| 2008/0141998 A1 * | 6/2008 | Sun | G05F 1/67 126/601 |
| 2008/0191628 A1 | 8/2008 | Marques | |
| 2008/0296975 A1 * | 12/2008 | Shakespeare | H02J 9/065 307/66 |
| 2009/0167091 A1 | 7/2009 | Popescu-Stanesti | |
| 2010/0159293 A1 * | 6/2010 | Hempel | H01M 10/0525 429/10 |
| 2012/0023340 A1 | 1/2012 | Cheung | |
| 2013/0147276 A1 * | 6/2013 | Yamamoto | H02J 3/387 307/64 |
| 2015/0008867 A1 * | 1/2015 | Smychkovich | H02J 7/0052 320/107 |
| 2016/0033986 A1 * | 2/2016 | Kamel | H02J 3/381 700/295 |
| 2016/0036268 A1 | 2/2016 | Laherty | |
| 2016/0141915 A1 * | 5/2016 | Descarries | H02J 7/04 315/86 |
| 2016/0273722 A1 | 9/2016 | Crenshaw | |
| 2017/0245334 A1 * | 8/2017 | Zhang | H02J 7/0068 |

\* cited by examiner

METHODS AND SYSTEMS FOR CHARGING A BACKUP BATTERY PACK

CROSS-REFERENCE TO RELATED APPLICATIONS

This application claims priority under 35 U.S.C. § 119 to U.S. Provisional Patent Application Ser. No. 62/296,927, titled "Methods and Systems For Charging a Battery Pack" and filed on Feb. 18, 2016, the entire contents of which are hereby incorporated herein by reference.

TECHNICAL FIELD

The present disclosure relates generally to battery packs, and more particularly to systems, methods, and devices for charging a battery pack.

BACKGROUND

Battery packs are used in a number of applications to provide power to electrical devices when a main source of power is interrupted. These battery packs are in communication with the primary source of power, both to ensure that the batteries in the battery pack are charged, and to know when the primary source of power is interrupted.

SUMMARY

In general, in one aspect, the disclosure relates to and electrical circuit. The electrical circuit can include a power supply that provides primary power, and an electrical load coupled to the power supply, where the electrical load operates using the primary power. The electrical circuit can also include an energy storage unit coupled to the power supply and the electrical load. The energy storage unit can include at least one energy storage device that stores reserve power using the primary power, and a first switch disposed between the power supply and the at least one energy storage device, where the first switch has an open position and a closed position. The energy storage unit can also include a controller that operates the first switch from the closed position to the open position after a first amount of time. The at least one energy storage device can receive the primary power when the first switch is in the closed position. The at least one energy storage device can fail to receive the primary power when the first switch is in the open position.

In another aspect, the disclosure can generally relate to a controller for an energy storage unit. The controller can include a control engine that follows a plurality of instructions to maintain a switch in a closed position for a first period of time, where the switch is disposed between a power supply and at least one energy storage device of the energy storage unit, where the power supply provides primary power to the at least one energy storage device during the first period of time. The control engine can also follow the plurality of instructions to operate the switch, when the first period of time has expired, from the closed position to an open position for a second period of time, where the energy storage unit fails to receive the primary power during the second period of time. The control engine can further follow the plurality of instructions to operate the switch, when the second period of time has expired, from the open position to the closed position, where the energy storage unit resumes receiving the primary power after the second period of time has expired.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
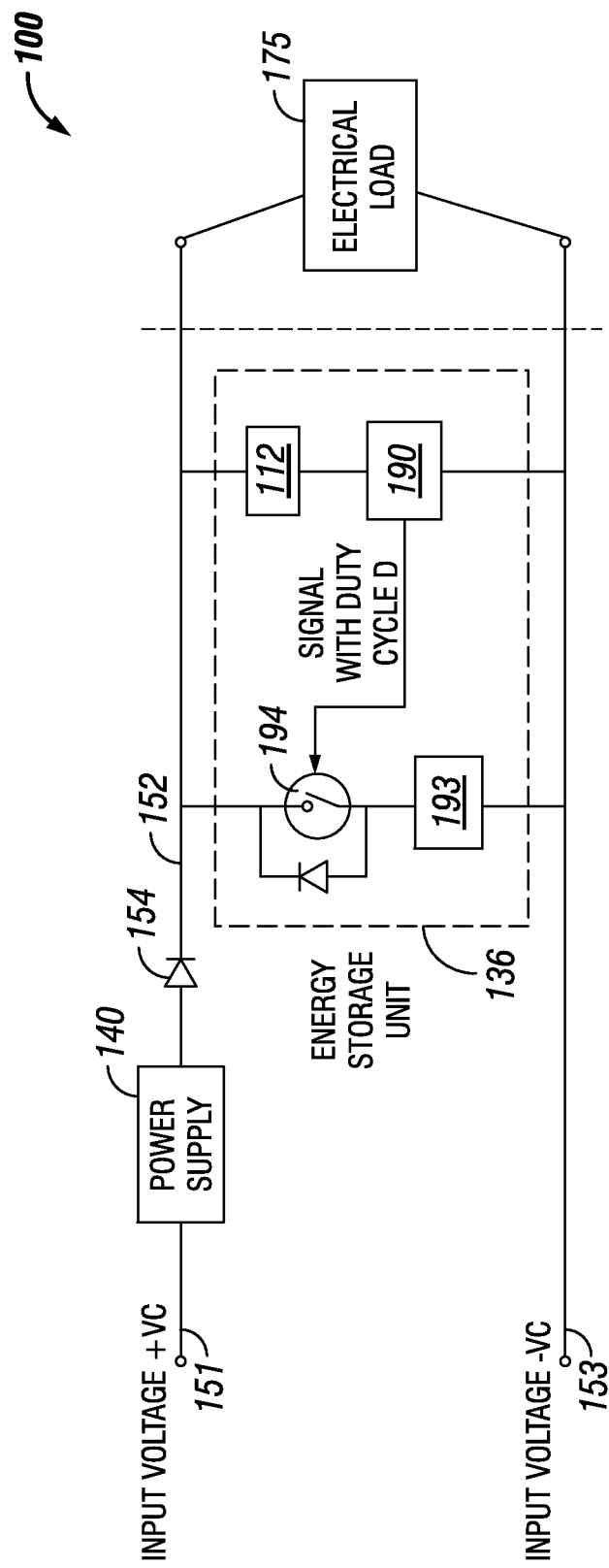
FIG. 1 shows a system diagram of an electrical circuit in accordance with certain example embodiments.

In general, example embodiments provide systems, methods, and devices for charging a battery pack. While example embodiments are described herein as being used to provide power to light-emitting diodes (LEDs), example embodiments can also be used to light sources using other types of technology (e.g., halogen, incandescent, sodium vapor, fluorescent). Also, while example embodiments are described herein as being used for light fixtures, example embodiments can be used for one or more of any number of electrical components that have power requirements over time. Example embodiments for charging a battery pack can be used in any of a number of applications, including but not limited to electrical enclosures (e.g., control panels) and/or electrical devices (e.g., light fixtures). Further, example embodiments for charging a battery pack can be used in one or more of any of a number of environments, including but not limited to hazardous (e.g., explosive) environments, indoors, outdoors, cold temperatures, hot temperatures, high humidity, marine environments, and low oxygen environments.

A user may be any person that interacts, directly or indirectly, with a battery pack. Examples of a user may include, but are not limited to, an engineer, an electrician, an instrumentation and controls technician, a mechanic, an operator, a consultant, a contractor, an inventory management system, an inventory manager, a labor scheduling system, a foreman, and a manufacturer's representative. In the foregoing figures showing example embodiments for charging a battery pack, one or more of the components shown may be omitted, repeated, and/or substituted. Accordingly, example embodiments for charging a battery pack should not be considered limited to the specific arrangements of components shown in any of the figures. For example, features shown in one or more figures or described with respect to one embodiment can be applied to another embodiment associated with a different figure or description.

In certain example embodiments, the systems (or portions thereof) that include example embodiments for charging a battery pack described herein meet one or more of a number of standards, codes, regulations, and/or other requirements established and maintained by one or more entities. Examples of such entities include, but are not limited to, Underwriters' Laboratories (UL), the National Electric Code (NEC), the California Energy Commission (CEC), the Institute of Electrical and Electronics Engineers (IEEE), the Federal Communication Commission (FCC), and the National Fire Protection Association (NFPA). For example, wiring (the wire itself and/or the installation of such wire) that electrically couples an example battery pack (defined below) with a device (e.g., a light fixture) may fall within one or more standards set forth in the NEC. As another example, UL standard 924 addresses requirements (e.g., a minimum amount of light output, a minimum amount of time that the battery pack illuminates the light sources) of emergency egress light fixtures and a battery pack within such fixtures.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments for charging a battery pack will be described more fully hereinafter with reference to the accompanying drawings, in which example embodiments for charging a battery pack are shown. Example embodiments for charging a battery pack may, however, be embodied in many different forms and should not be construed as limited to the example embodiments set forth herein. Rather, these example embodiments are provided so that this disclosure will be thorough and complete, and will fully convey the scope of charging a battery pack to those of ordinary skill in the art. Like, but not necessarily the same, elements (also sometimes called components) in the various figures are denoted by like reference numerals for consistency.

Terms such as "first", "second", "top", "bottom", "side", "width", "length", "inner", and "outer are used merely to distinguish one component (or part of a component or state of a component) from another. Such terms are not meant to denote a preference or a particular orientation, and are not meant to limit embodiments for charging a battery pack. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of an electrical circuit 100 in accordance with certain example embodiments. The electrical circuit 100 of FIG. 1 can include one or more of a number of components. For example, as shown in FIG. 1, the electrical circuit 100 can include a power supply 140, an electrical load 175, a diode 154, and the energy storage unit 136 (another name used herein for a battery pack). The energy storage unit 136 can include one or more of a number of components, including but not limited to a switch 194, at least one energy storage device 193, a power module 112, and a controller 190.

Referring to FIG. 1, the power supply 140 provides power (also called primary power herein), using electrical conductors (e.g., electrical conductor 152, electrical conductor 153), to the energy storage unit 136 and the electrical load 175. The power supply 140 can be called by any of a number of other names, including but not limited to a driver, a LED driver, and a ballast. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a constant voltage-constant current (CV-CC) converter, a generic converter) that receives power (for example, through one or more electrical conductors 151) from a power source (not shown in FIG. 1) and generates power of a type (e.g., alternating current, direct current) and level (e.g., 12V, 24V, 120V) that can be used by the electrical load 175 and the example energy storage unit 136. In addition, or in the alternative, the power supply 140 can be a source of power in itself. For example, the power supply 140 can be a battery, a localized photovoltaic power system, or some other source of independent power.

The electrical load 175 of the electrical circuit 100 can be one or more of a number of electrical devices that operate using the primary power supplied by the power supply 140. In addition, when the power supply 140 fails to provide the primary power, the electrical load 175 can operate using reserve power supplied by the energy storage unit 136. Examples of electrical devices that can be included in the electrical load 175 include, but are not limited to, a light source, a motor, a heating element, and a control device. The electrical load 175 can be fixed or variable.

In certain example embodiments, the energy storage unit 136 of the electrical circuit 100 is electrically coupled to the power supply 140 and the electrical load 175. The energy storage unit 136 is configured to receive primary power from the power supply 140 in order to charge the energy storage device 193. In addition, the energy storage unit 136 is configured to provide reserve power to the electrical load 175 when the power supply 140 stops providing the primary power.

As discussed above, the energy storage unit 136 can include one or more of a number of components. The various components of an example energy storage unit 136 and/or their arrangement with respect to each other are not limited to what is shown in FIG. 1 and described below. For example, as shown in FIG. 7B below, the power module 112 can be part of the controller 190 rather than a separate component from the controller 190. Further, a component of the energy storage unit 136 can include additional or fewer features relative to those described herein.

The power module 112 shown in the energy storage unit 136 of FIG. 1 can provide power to one or more other components (e.g., the controller 190) or portions thereof (e.g., a timer, a control engine) of the energy storage unit 136. The power module 112 can include one or more of a number of single or multiple discrete components (e.g., transistor, diode, resistor), and/or a microprocessor (also called a hardware processor herein). The power module 112 may include a printed circuit board, upon which the hardware processor and/or one or more discrete components are positioned. For example, the power module 112 can be configured to determine the amount of primary power provided by the power supply 140 at a given point in time.

The power module 112 can include one or more components (e.g., a transformer, a diode bridge, an inverter, a converter) that receives power from a source (e.g., the power supply 140) and generates power of a type (e.g., alternating current, direct current) and level (e.g., 12V, 24V, 120V) that can be used by the one or more of the other components (e.g., the controller 190) of the energy storage unit 136. In addition, or in the alternative, the power module 112 can be a source of power in itself to provide signals to the other components of the controller 190. For example, the power module 112 can be a battery. As another example, the power module 112 can be a localized photovoltaic power system.

Some or all of the energy storage device 193 can receive primary power (in this case, channeled through the switch 194 controlled by the controller 190) provided by the power supply 140. If the switch 194 is used to channel the primary power to the energy storage device 193, the switch 194 can operate based on instructions received from the controller 190. Further, the controller 190 can alter the frequency and/or the duty cycle of the primary power, in some cases using the switch 194. In any case, the switch 194 can open when the energy storage device 193 does not need charging by the power supply 140, and the switch 194 that can close when an energy storage device 193 needs to be charged by the power supply 140.

Each switch 194 can be any type of device that changes state (e.g., open position, closed position) based on certain conditions. Examples of a switch can be and/or include, but are not limited to, a transistor (e.g., field-effect transistor, bipolar junction transistor), a dipole switch, a relay contact, a diode, a resistor, and a NOR gate. In certain example embodiments, the switch 194 can operate (e.g., change from a closed position to an open position, change from an open position to a closed position) based on input from the controller 190.

As an example, during an initial period of operation (e.g., 24 hours) measured by a timer of the controller 190, the controller 190 maintains the switch 194 in a closed position to allow the primary power to feed the energy storage device 193. After the initial period of operation has expired, the controller 190 operates the switch 194 from the closed position to the open position, thereby preventing the primary power to be provided by the power supply 140 to the energy storage device 193. This initial period of operation can be an amount of time that the energy storage device 193 is deemed to be fully charged. The initial period of operation can be a pre-determined number. Alternatively, the initial period of operation can be measured and/or calculated. During the initial period of operation, the energy storage device 193 is charged at a charging rate, which is at a level sufficient to allow the energy storage device 193 to be continually charged by the power supply 140 without damage.

After the initial period of operation, a maintenance mode of operation of the energy storage unit 136 is commenced by the controller 190. During the maintenance mode of operation, the controller 190 pulse charges the energy storage device 193 by operating the switch 194 by controlling the frequency of the wave form delivered to the switch 194 and/or by controlling a duty cycle of the operation of the switch 194. The frequency of the wave form can be for any type of wave form (e.g., sinusoidal, positive-going sinusoidal, square wave). The frequency is the number of cycles per second of the wave form and can be used, at least in part, to perform the pulsed charging of the energy storage device 193 during the maintenance mode of operation.

The duty cycle of the switch 194 can be how often the switch changes from one position (e.g., an open position) to another position (e.g., a closed position). The duty cycle can be based on one or more of a number of factors. Examples of such factors can include, but are not limited to, the maximum amount of power delivered to the energy storage device 193 during the maintenance mode of operation, full load efficiency of the energy storage device 193, and load efficiency of the power module 112. Some of these factors (e.g., full load efficiency of the energy storage device 193, load efficiency of the power module 112) can be determined based on laboratory test results of a component (in this case, the power supply 140) of the electrical circuit 100.

The duty cycle of the switch 194 can be determined using a mathematical formula. For example, the duty cycle of the switch 194 can be determined using the following formula:

$$\text{Maximum allowed maintenance and no battery mode power} < D\left(\frac{\text{Full load output power}}{\text{Full load efficiency}}\right) + (1-D)\left(\frac{\text{Housekeeping load output power}}{\text{Housekeeping load efficiency}}\right),$$

where the housekeeping load output power and efficiency refers to the power module 112, D is the duty cycle, battery is a kind of energy storage device 193, and the full load output power and efficiency refers to the power supply 140.

In certain example embodiments, the duty cycle of the switch 194 causes a charge rate of the energy storage device 193 during the maintenance mode of operation to be greater than the rate at which the energy storage device 193 discharges (releases the reserve power), which can be determined through empirical data and/or a datasheet of the energy storage device 193. In some cases, the maintenance mode of operation (pulse charge of the energy storage device 193) continues until the energy storage device 193 discharges. In such a case, the process can repeat, where the energy storage device 193 is charged for the initial period of operation, after which time the maintenance mode of operation again begins.

Parameters used during the initial period of operation (e.g., time) and/or during the maintenance mode of operation (e.g., frequency of the wave form, duty cycle of the switch 194) can be programmed (e.g., using EEPROM, hard-coded) into the controller 190. The time of the initial period of operation can be determined using one or more of a number of methods, including but not limited to experimental testing.

The energy storage device 193 can be any number of rechargeable devices (e.g., batteries, supercapacitors) that are configured to charge using the primary power. In some cases, the energy storage device 193 charges using a different level and/or type of power relative to the level and type of power of the primary power. There can be any number (e.g., one, two, five) of energy storage devices 193. The energy storage devices 193 can use one or more of any number of battery technologies. Examples of such technologies can include, but are not limited to, nickel-cadmium, nickel-metalhydride, lithium-ion, and alkaline. Aside from a battery, an energy storage device 193 can take on any of a number of other forms known in the art. For example, an energy storage device 193 can include one or more supercapacitors.

In certain example embodiments, the switch 194 (or another switch not shown in FIG. 1) can be used to allow reserve power discharged by the energy storage device 193 to flow to the electrical load 175. In such a case, the switch 194 is in a closed position to allow the reserve power to flow to the electrical load 175 during times when the primary power is not provided by the power supply 140. In certain example embodiments, in such a case, the switch 194 can operate (e.g., change from a closed position to an open position, change from an open position to a closed position) based on input from the controller 190.

In certain example embodiments, the controller 190 monitors the flow of primary power received from the power supply 140 and controls when the primary power stored in the energy storage device 193 is discharged as reserve power. The controller 190 can also control the switch 194 during the maintenance mode of operation by controlling the square wave of frequency and/or the duty cycle. The controller 190 can be autonomous, self-learning, reporting, controlled by a user, controlled by a network manager, and/or operate in any of a number of other modes.

In certain example embodiments, the controller 190 can include one or more of a number of components. For example, such components can include a control engine, a communication module, a timer, an energy metering module, a storage repository, a hardware processor, a memory, a transceiver, an application interface, and a security module. The controller 190 can correspond to a computer system 218 as described below with regard to FIG. 2.

In certain example embodiments, the controller 190 does not include a hardware processor. In such a case, the controller 190 can include, as an example, one or more field programmable gate arrays (FPGA) and/or an integrated circuit. Using FPGAs, integrated circuits, and/or other similar devices known in the art allows the controller 104 (or portions thereof) to be programmable and function according to certain logic rules and thresholds without the use of a hardware processor. Alternatively, FPGAs, integrated circuits, and/or similar devices can be used in conjunction with one or more hardware processors.

By way of some examples of embodiments described herein, consider the following:

Example 1

Under CEC Title 20 specifications, when the energy storage device 193 is a 3Ah battery, and for a 14 W variant, the maximum average input power during the initial period of operation when the initial period of operation is 24 hours is 2.9 W. The maximum average input power during the maintenance mode of operation is 1.08 W.

Example 2

Under CEC Title 20 specifications, when the energy storage device 193 is a 3Ah battery, and for a 7 W variant, the maximum average input power during the initial period of operation when the initial period of operation is 24 hours is 1.7 W. The maximum average input power during the maintenance mode of operation is 1.04 W.

In both of these cases, in order to be compliant with CEC Title 20, the energy storage device 193 cannot be constantly connected to the power supply 140 during the maintenance mode of operation. As a result, by using example embodiments, pulsed charging of the energy storage device 193 using the primary power provided by the power supply 140 is utilized during the maintenance mode of operation. To accomplish the pulsed charging, the controller 190 of the energy storage unit 136 operates the switch 194, which alternatively disconnects and connects the energy storage device 193 to the power supply 140 at a specific duty cycle.

An example of the duty cycle can be determined by the following equation: Maximum maintenance power=(duty cycle*full load input power provided to the energy storage device 193)+[(1−duty cycle)*input power provided by the power module 112 to the controller 190]. In any case, the timer of the controller 190 tracks the time that defines the initial period of operation as well as the duty cycle. The process for charging the energy storage device 193 starts anew after every discharge cycle (i.e., after the energy storage device 193 is called upon to provide reserve power to the electrical load 175.

Figure 2:
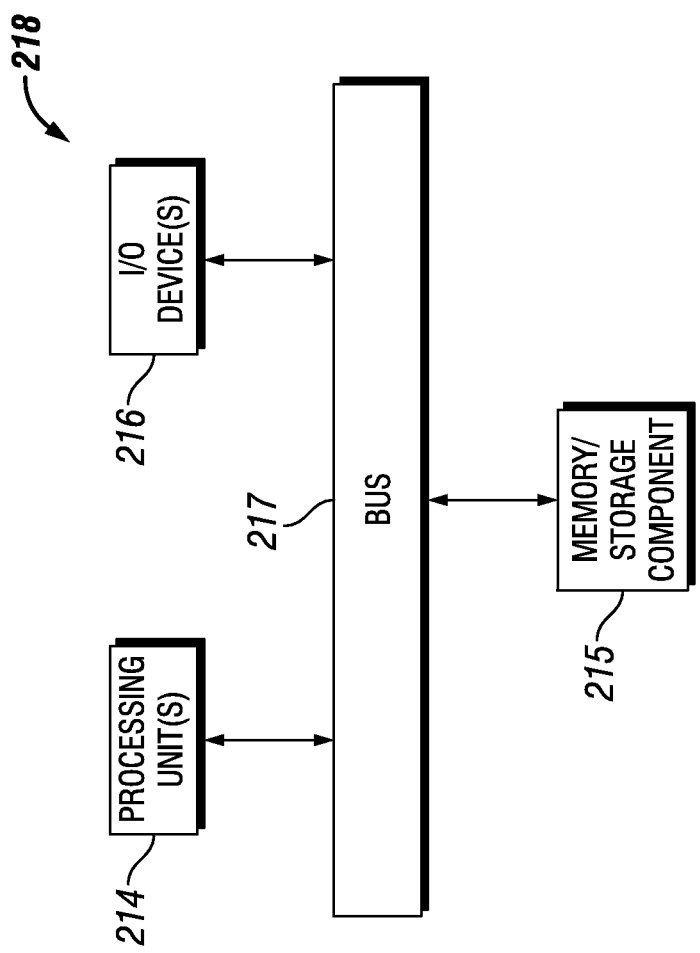
FIG. 2 shows a computing device in accordance with certain example embodiments.

One or more of the functions performed by any of the components (e.g., controller 190) of an example energy storage unit (e.g., energy storage unit 126) can be performed using a computing device 218. An example of a computing device 218 is shown in FIG. 2. The computing device 218 implements one or more of the various techniques described herein, and which is representative, in whole or in part, of the elements described herein pursuant to certain example embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain example embodiments. Further, one or more embodiments is implemented on a distributed system having one or more nodes, where each portion of the implementation (e.g., controller 190) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3:
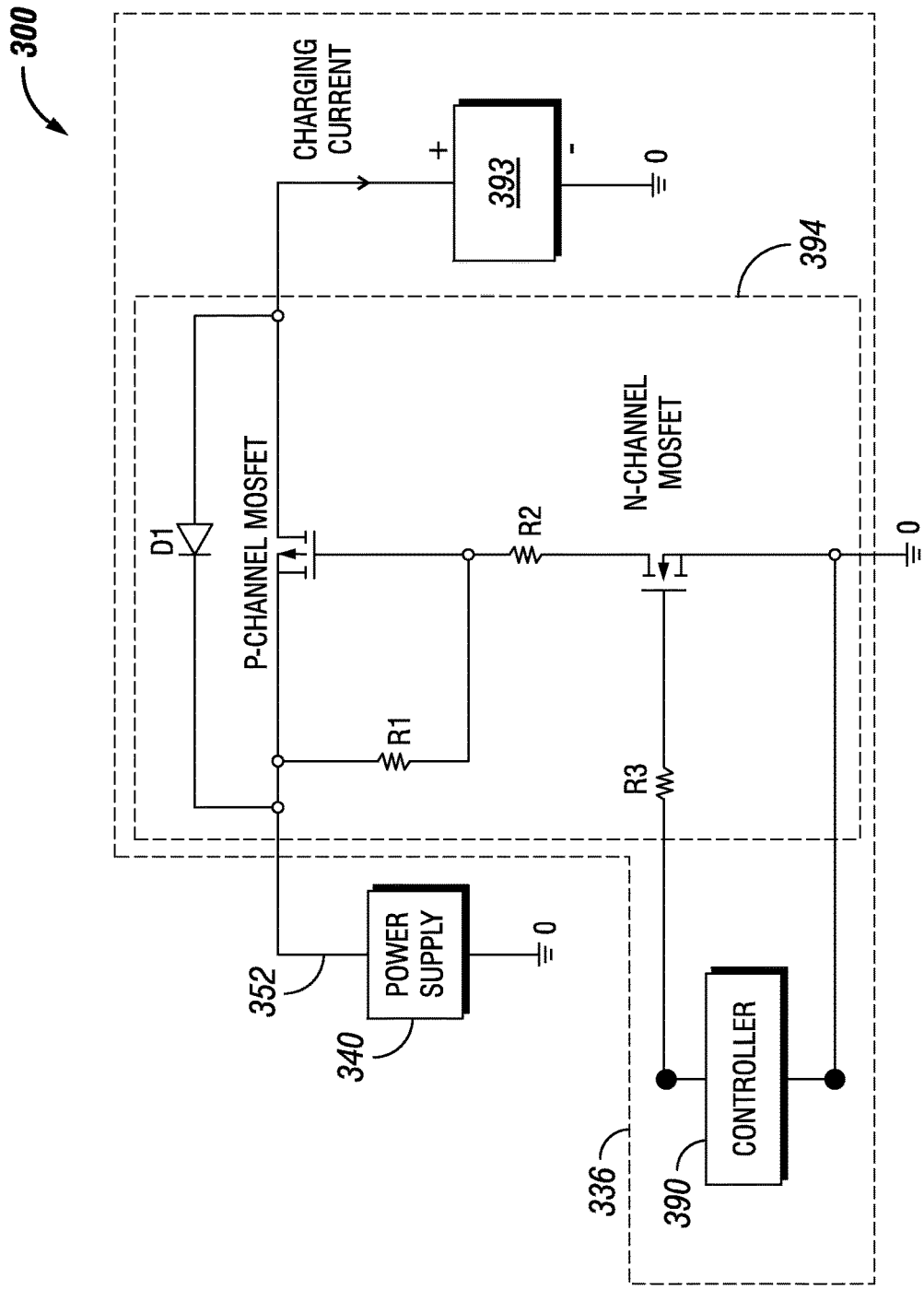
FIG. 3 shows a system diagram that includes an energy storage unit being charged in accordance with certain example embodiments.
Figure 4:
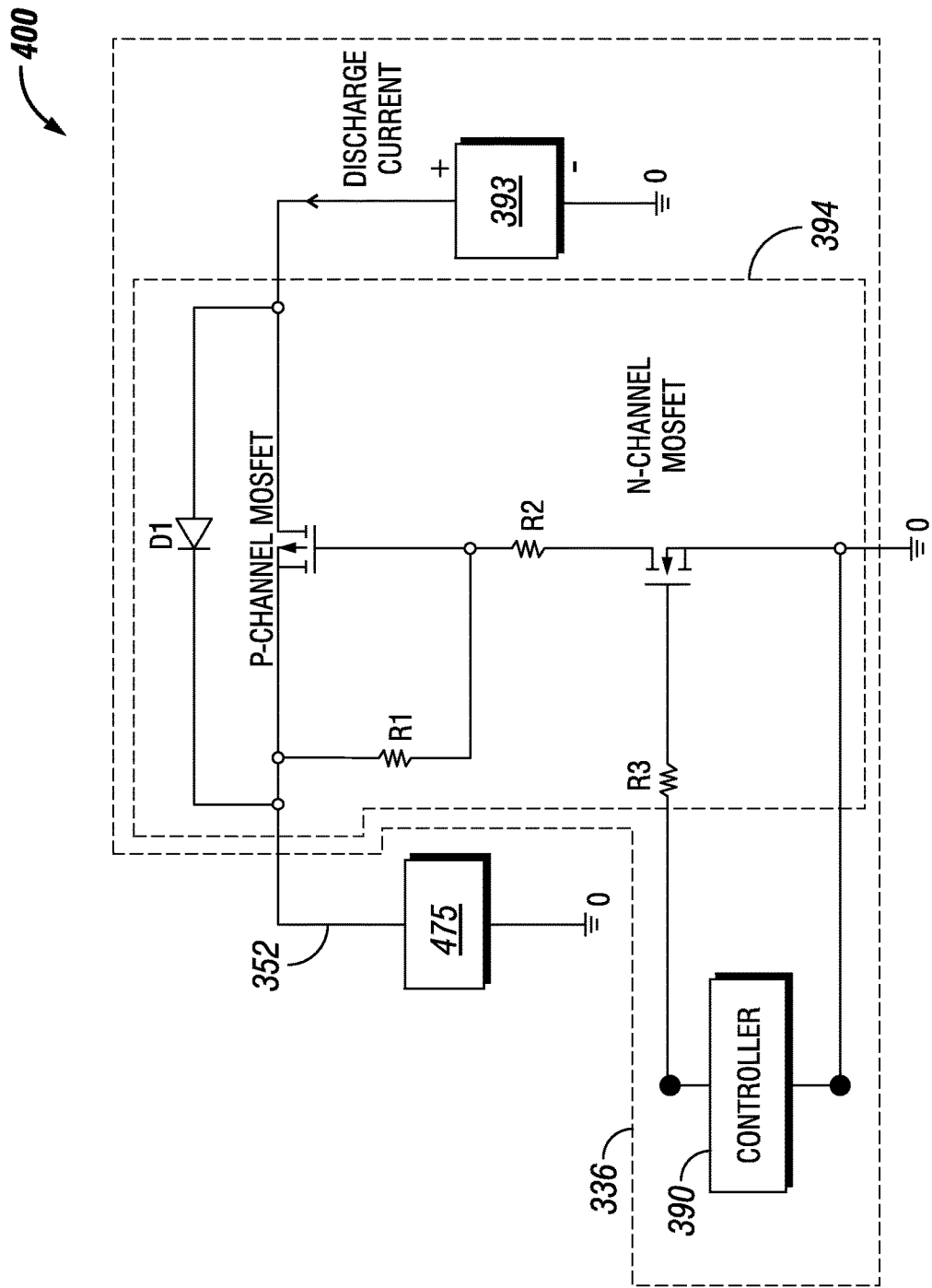
FIG. 4 shows the system diagram of FIG. 3 with the energy storage unit discharging in accordance with certain example embodiments.

FIG. 3 shows a system diagram 300 that includes an energy storage unit 336 being charged in accordance with certain example embodiments. FIG. 4 shows the system diagram 400 with the energy storage unit 336 discharging in accordance with certain example embodiments. Specifically, in FIG. 3, the power supply 340 is providing primary power, through electrical conductor 352, to the energy storage device 393 of the energy storage unit 336 through the switch 394 during the maintenance mode of operation. In FIG. 4, the energy storage device 393 is providing reserve power, through electrical conductor 352, to the electrical load 475 through the switch 394 during the discharge mode (i.e., after the maintenance mode of operation has ended, signified by the power supply 340 ceasing to provide primary power). In this case, the switch 394 includes a diode, three resistors, a p-channel MOSFET, and a n-channel MOSFET. Further, the switch 394 is controlled by the controller 390.

Figure 5:
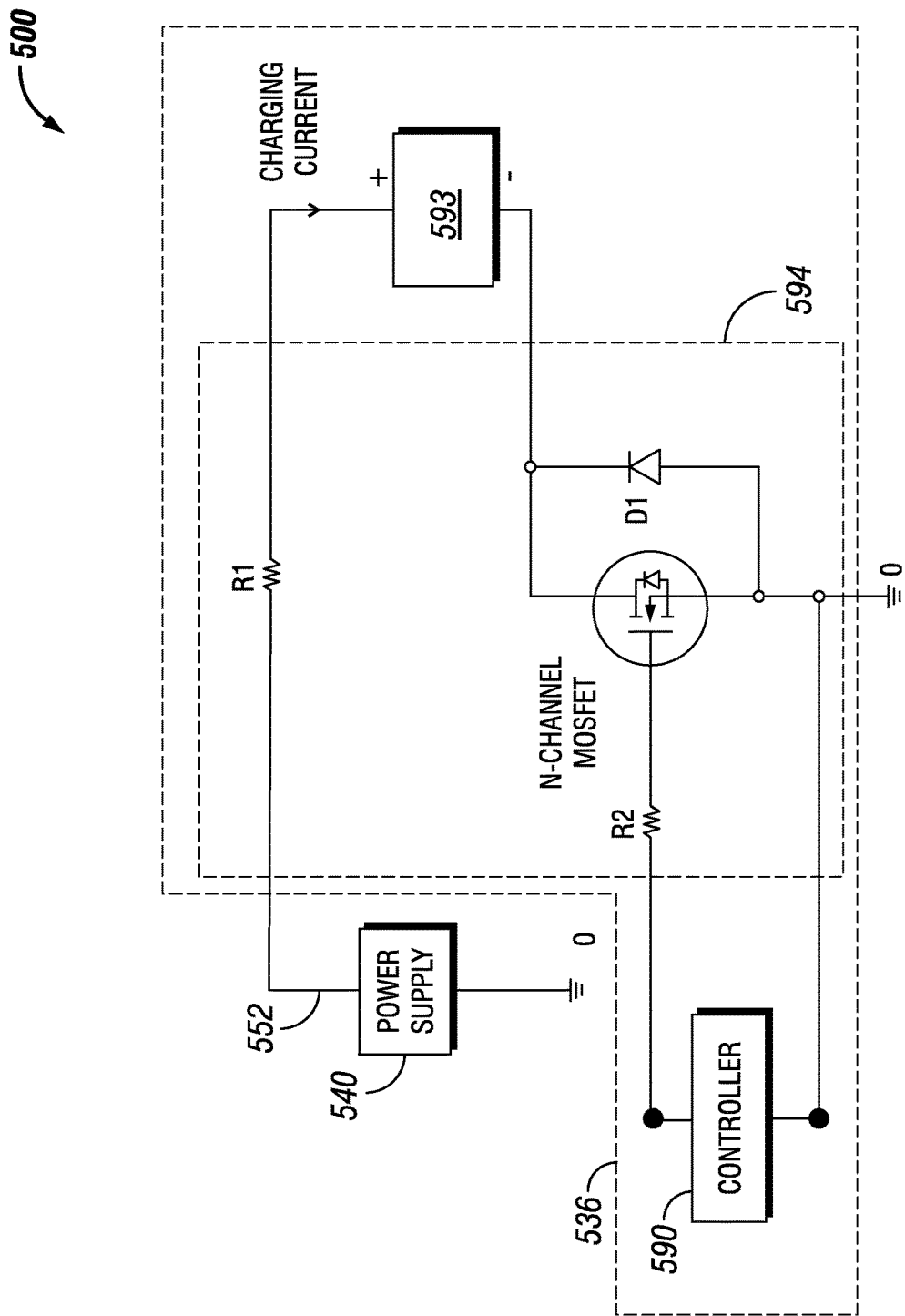
FIG. 5 shows another system diagram that includes an energy storage unit being charged in accordance with certain example embodiments.
Figure 6:
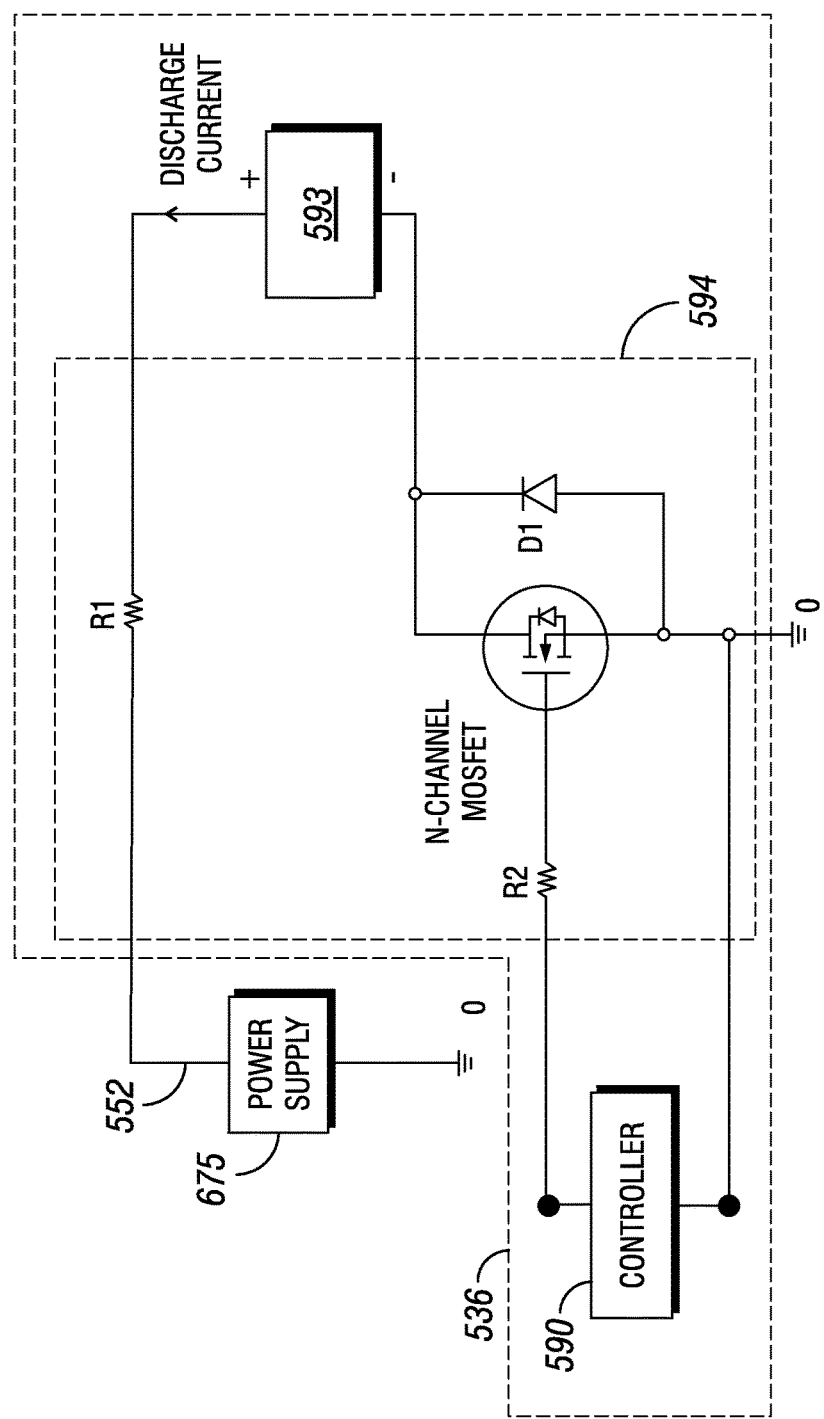
FIG. 6 shows the system diagram of FIG. 5 with the energy storage unit discharging in accordance with certain example embodiments.

FIG. 5 shows another system diagram 500 that includes an energy storage 536 unit being charged in accordance with certain example embodiments. FIG. 6 shows the system diagram 600 with the energy storage unit 536 discharging in accordance with certain example embodiments. Specifically, in FIG. 5, the power supply 540 is providing primary power, through electrical conductor 552, to the energy storage device 593 of the energy storage unit 536 through the switch 594 during the maintenance mode of operation. In FIG. 6, the energy storage device 593 is providing reserve power, through electrical conductor 552, to the electrical load 675 through the switch 594 during the discharge mode (i.e., after the maintenance mode of operation has ended, signified by the power supply 540 ceasing to provide primary power). In this case, the switch 594 includes a diode, two resistors, and a n-channel MOSFET. Further, the switch 594 is controlled by the controller 590.

Figure 7A:
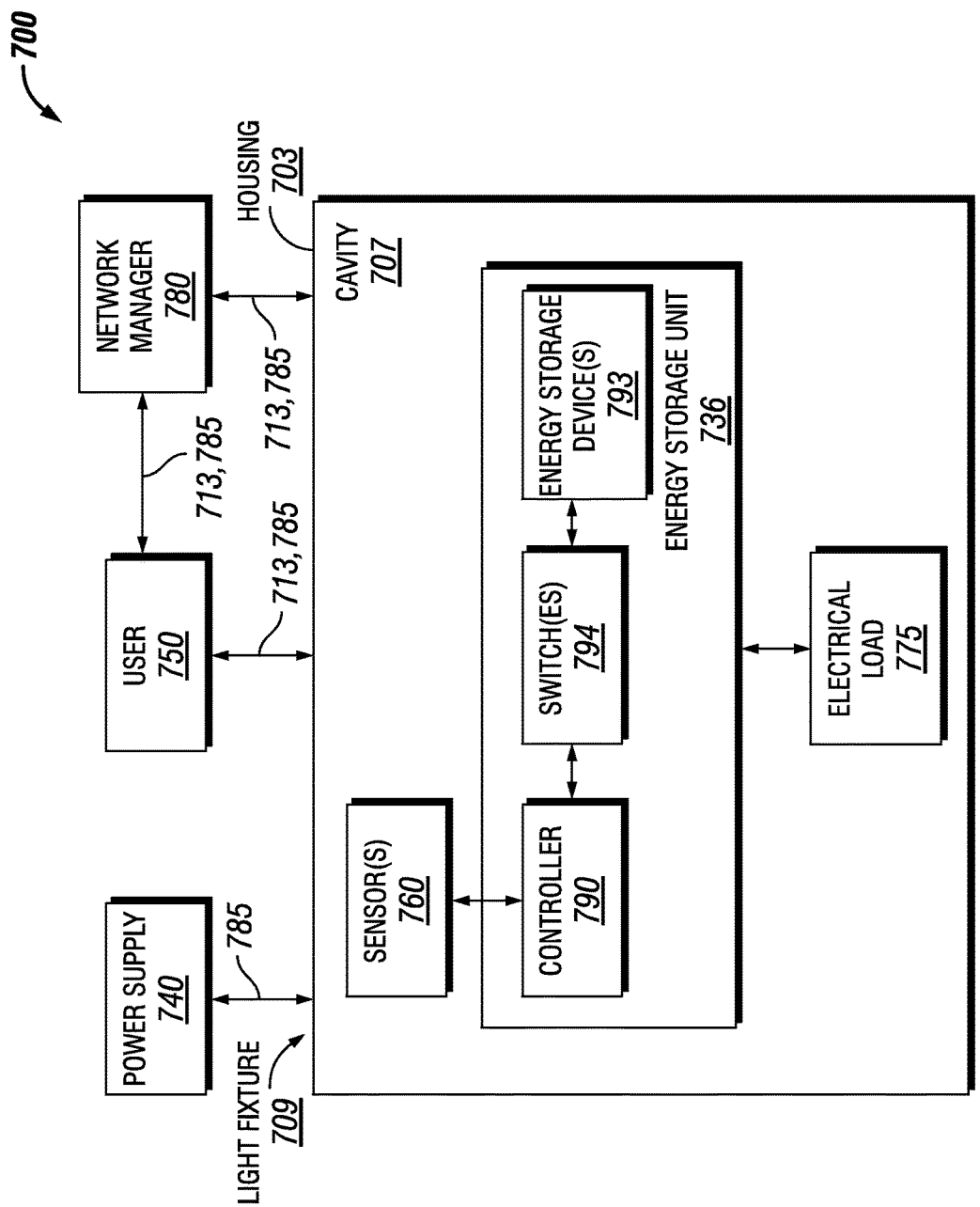
FIGS. 7A and 7B show a system diagram of a light fixture that includes a controller for a battery pack in accordance with certain example embodiments.
Figure 7B:
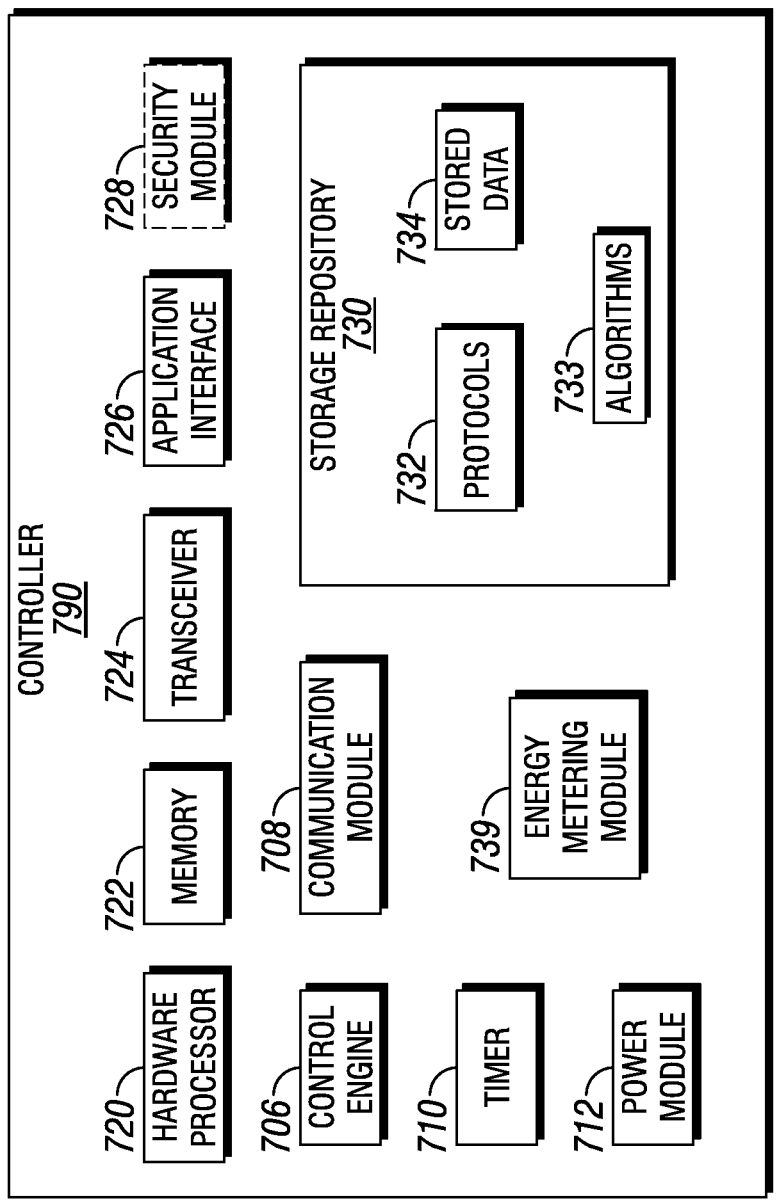

FIGS. 7A and 7B show a system diagram of a lighting system 700 that includes an energy storage unit 736 for a light fixture 709 in accordance with certain example embodiments. Specifically, FIG. 7A shows the lighting system 700 that includes an energy storage unit 736, and FIG. 7B shows a detailed system diagram of a controller 790 of the energy storage unit 736. Referring to FIGS. 1-7B, the lighting system 700 can include one or more components. For example, as shown in FIGS. 7A and 7B, the lighting system 700 can include a user 750, a network manager 780, a power supply 740, and at least one light fixture 709. The light fixture 709 can include an energy storage unit 736 (which includes the controller 790, one or more energy storage devices 793, and one or more switches 794), one or more sensors 760 (also sometimes called sensor modules 760), and an electrical load 775 (which in this case includes one or more light sources). The power supply 740 can be substantially similar to the power supplies discussed above. The power supply 740 can include one or more of any number of components, including but not limited to a transformer, a rectifier, a fuse, an inverter, and a converter.

FIG. 7B shows a system diagram of a controller 790 for an energy storage unit 736 in accordance with certain example embodiments. The controller 790 can include one or more of a number of components. Such components, can include, but are not limited to, a control engine 706, a communication module 708, a timer 710, an energy metering module 739, a power module 712, a storage repository 730, a hardware processor 720, a memory 722, a transceiver 724, an application interface 735, and, optionally, a security module 728. The components shown in FIGS. 7A and 7B are not exhaustive, and in some embodiments, one or more of the components shown in FIGS. 7A and 7B may not be included in an example light fixture 709 or, more specifically, an example energy storage unit 736. Further, one or more components shown in FIGS. 7A and 7B can be rearranged. For example, the power module 712 can be separate from the controller 790 of FIG. 7B. As another example, one or more switches 794 of FIG. 7A can be part of the controller 790 of FIG. 7B. Any component of the example controller 790, as with the example energy storage unit 736, can be discrete or combined with one or more other components of the controller 790 (or energy storage unit 736).

A user 750 may be any person that interacts with light fixtures or other devices that use example embodiments. Examples of a user 750 are provided above. The user 750 can use a user system (not shown), which may include a display (e.g., a GUI). The user 750 interacts with (e.g., sends data to, receives data from) the controller 790 of the light fixture 709 via the application interface 726 (described below). The user 750 can also interact with a network manager 780 and/or one or more of the sensors 760. Interaction between the user 750 and the light fixture 709, the network manager 780, and the sensors 760 can be conducted using signal transfer links 713 and/or power transfer links 785.

Each signal transfer link 713 and each power transfer link 785 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100, inductive power transfer) technology. For example, a signal transfer link 713 can be (or include) one or more electrical conductors (e.g., electrical conductor 152, electrical conductor 553) that are coupled to the housing 703 of the light fixture 709 and to a sensor 760. A signal transfer link 713 can transmit signals (e.g., communication signals, control signals, data) between the light fixture 709 and the user 750, the network manager 780, and/or one or more of the sensors 760. Similarly, a power transfer link 785 can transmit power between the energy storage unit 736 and the user 750, the network manager 780, and/or one or more of the sensors 760. One or more signal transfer links 713 and/or one or more power transfer links 785 can also transmit signals and power, respectively, between components (e.g., controller 790, sensor 760, switch 794) within the housing 703 of the light fixture 709.

The network manager 780 is a device or component that can communicate with the energy storage unit 736. For example, the network manager 780 can send instructions to the controller 790 of the energy storage unit 736 as to when certain switches 794 should be operated (change state). As another example, the network manager 780 can receive data (e.g., run time, current flow) associated with the operation of each energy storage unit 736 to determine when maintenance should be performed on the energy storage unit 736 or portions thereof.

The one or more sensors 760 can be any type of sensing device that measure one or more parameters. Examples of types of sensors 760 can include, but are not limited to, a resistor, a Hall Effect current sensor, a thermistor, a vibration sensor, an accelerometer, a passive infrared sensor, a photocell, and a resistance temperature detector. A parameter that can be measured by a sensor 760 can include, but is not limited to, current, voltage, power, resistance, vibration, position, and temperature. In some cases, the parameter or parameters measured by a sensor 760 can be used to operate one or more electrical load 775 of the light fixture 709. Each sensor 760 can use one or more of a number of communication protocols. A sensor 760 can be associated with the light fixture 709 (or portion thereof, such as an energy storage unit 736) or another light fixture in the system 700. A sensor 760 can be located within the housing 703 of the light fixture 709 (as shown in FIG. 7A), disposed on the housing 703 of the light fixture 709, or located outside the housing 703 of the light fixture 709.

The user 750, the network manager 780, and/or the sensors 760 can interact with the controller 790 of the energy storage unit 736 using the application interface 735 in accordance with one or more example embodiments. Specifically, the application interface 735 of the controller 790 receives data (e.g., information, communications, instructions, updates to firmware) from and sends data (e.g., information, communications, instructions) to the user 750, the network manager 780, and/or each sensor 760. The user 750, the network manager 780, and/or each sensor 760 can include an interface to receive data from and send data to the controller 790 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 790, the user 750, the network manager 780, and/or the sensors 760 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 790. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described above with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 700.

As discussed above, the light fixture 709 can include a housing 703. The housing 703 can include at least one wall that forms a cavity 707. In some cases, the housing 703 can be designed to comply with any applicable standards so that the light fixture 709 (including portions thereof, such as the energy storage unit 736) can be located in a particular environment (e.g., a hazardous environment). For example, if the light fixture 709 is located in an explosive environment, the housing 703 can be explosion-proof. According to applicable industry standards, an explosion-proof enclosure is an enclosure that is configured to contain an explosion that originates inside, or can propagate through, the enclosure.

The housing 703 of the light fixture 709 can be used to house one or more components of the energy storage unit 736, including one or more components of the controller 790. For example, as shown in FIGS. 7A and 7B, the controller 790 (which in this case includes the control engine 706, the communication module 708, the timer 710, the energy metering module 739, the power module 712, the storage repository 730, the hardware processor 720, the memory 722, the transceiver 724, the application interface 735, and the optional security module 728), the power supply 740, and the electrical load 775 are disposed in the cavity 707 formed by the housing 703. In alternative embodiments, any one or more of these or other components of the light fixture 709 can be disposed on the housing 703 and/or remotely from the housing 703.

The storage repository 730 can be a persistent storage device (or set of devices) that stores software and data used to assist the controller 790 in communicating with the user 750, the network manager 780, and one or more sensors 760 within the system 700. In one or more example embodiments, the storage repository 730 stores one or more protocols 732, algorithms 733, and stored data 734. The protocols 732 can be any procedures (e.g., a series of method steps) and/or other similar operational procedures that the control engine 706 of the controller 790 follows based on certain conditions at a point in time. The protocols 732 can include any of a number of communication protocols that are used to send and/or receive data between the controller 790 and the user 750, the network manager 780, and one or more sensors 760.

A protocol 732 can be used for wired and/or wireless communication. Examples of a protocol 732 can include, but are not limited to, Modbus, profibus, Ethernet, and fiberoptic. One or more of the protocols 732 can be a time-synchronized communication protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 732 can provide a layer of security to the data transferred within the system 700.

The algorithms 733 can be any formulas, logic steps, mathematical models, and/or other suitable means of manipulating and/or processing data. One or more algorithms 733 can be used for a particular protocol 732. For example, a protocol 732 can call for measuring (using the energy metering module 739), storing (using the stored data 734 in the storage repository 730), and evaluating (using an algorithm 733) the current and voltage delivered to a particular electrical load 775 at a particular point in time. The control engine 706 can be configured to modify one or more algorithms 733 by evaluating output of a previous version of an algorithm 733 relative to actual results.

As discussed above, the controller 790 controls one or more of the switches 794 in certain example embodiments. The controller 790 can base its control of a switch 794 using a protocol 732, an algorithm 733, and or stored data 734. For example, a protocol 732 can dictate the length of the initial period of time (e.g., measured by the timer 710) where the power supply 740 provides primary power to the energy storage devices 793. As another example, an algorithm 733 can be used, in conjunction with measurements made by one or more sensors 760 and/or the energy metering module 739, to determine how often one or more switches 794 are operated during the maintenance mode of operation.

Stored data 734 can be any data associated with the light fixture 709, including the energy storage unit 736, other light fixtures in the system 700, any measurements taken by the sensors 760, measurements taken by the energy metering module 739, time measured by the timer 710, threshold values, current ratings for the power supply 740, results of previously run or calculated algorithms 733, and/or any other suitable data. Such data can be any type of data, including but not limited to historical data for the energy storage unit 736 (including any components thereof, such as the power supply 740), historical data for the light fixture 709, calculations, measurements taken by the energy metering module 739, and measurements taken by one or more sensors 760. The stored data 734 can be associated with some measurement of time derived, for example, from the timer 710.

Examples of a storage repository 730 can include, but are not limited to, a database (or a number of databases), a file system, a hard drive, flash memory, some other form of solid state data storage, or any suitable combination thereof. The storage repository 730 can be located on multiple physical machines, each storing all or a portion of the protocols 732, the algorithms 733, and/or the stored data 734 according to some example embodiments. Each storage unit or device can be physically located in the same or in a different geographic location.

The storage repository 730 can be operatively connected to the control engine 706. In one or more example embodiments, the control engine 706 includes functionality to communicate with the user 750, the network manager 780, and the sensors 760 in the system 700. More specifically, the control engine 706 can send information to and/or receives information from the storage repository 730 in order to communicate with the user 750, the network manager 780, and the sensors 760. As discussed below, the storage repository 730 can also be operatively connected to the communication module 708 in certain example embodiments.

In certain example embodiments, the control engine 706 of the controller 790 controls the operation of one or more components (e.g., the communication module 708, the timer 710, the transceiver 724) of the controller 790. For example, the control engine 706 can activate the communication module 708 when the communication module 708 is in "sleep" mode and when the communication module 708 is needed to send data received from another component (e.g., a sensor 760, the user 750) in the system 700.

As another example, the control engine 706 can acquire the current time using the timer 710. The timer 710 can enable the controller 790 to control the energy storage unit 736 (including any components thereof, such as the power module 712 and one or more switches 794) even when the controller 790 has no communication with the network manager 780 or the user 750. As yet another example, the control engine 706 can direct the energy metering module 739 to measure the charge level of an energy storage device 793 to the network manager 780. In some cases, the control engine 706 of the controller 790 can control the position (e.g., open, closed) of each switch 794, which allows or prevents the power supply 740 to receive primary power from the power supply 740. Similarly, the control engine 706 of the controller 790 can control the position of one or more other switches 794, which allows or prevents one or more of the energy storage units 736 to provide reserve power to the electrical load 775.

The control engine 706 can use any of the protocols 732 and/or algorithms 733 stored in the storage repository 730 to determine when to change the position of one or more switches 794. As a specific example, the control engine 706 can follow a protocol 732 by measuring (using the energy metering module 739), storing (as stored data 734 in the storage repository 730), and evaluating, using an algorithm 733, the current and voltage delivered by the amount of primary power stored in the energy storage devices 793. In this way, the operation of each energy storage device 793 can be optimized to increase the reliability of the energy storage unit 736. As another specific example, the control engine 706 can determine, based on measurements made by the energy metering module 739, whether a particular energy storage device 793 has failed. In such a case, the control engine 706 can change the position of one or more switches 794 to bypass the energy storage device 793 that failed.

The control engine 706 can generate an alarm when an operating parameter (e.g., total number of operating hours, number of consecutive operating hours, number of operating hours delivering power above a current level, input power quality, vibration, operating ambient temperature, operating device temperature, and cleanliness (e.g., air quality, fixture cleanliness)) of the energy storage unit 736 (or component thereof) exceeds or falls below a threshold value, indicating possible present or future failure of the energy storage unit 736 (or component thereof). The control engine 706 can further measure (using one or more sensors 760) and analyze the magnitude and number of surges that the energy storage unit 736 is subjected to over time.

Using one or more algorithms 733, the control engine 706 can predict the expected useful life of the energy storage unit 736 (or a particular component thereof) based on stored data 734, a protocol 732, one or more threshold values, and/or some other factor. The control engine 706 can also measure (using one or more sensors 760) and analyze the efficiency of the energy storage unit 736 (or component thereof) over time. An alarm can be generated by the control engine 706 when the efficiency of the energy storage unit 736 (or component thereof) falls below a threshold value, indicating failure of the energy storage unit 736 (or component thereof, such as a particular energy storage device 793).

The control engine 706 can provide power, control, communication, and/or other similar signals to the user 750, the network manager 780, and one or more of the sensors 760. Similarly, the control engine 706 can receive power, control, communication, and/or other similar signals from the user 750, the network manager 780, and one or more of the sensors 760. The control engine 706 can control each sensor 760 automatically (for example, based on one or more algorithms stored in the control engine 706) and/or based on power, control, communication, and/or other similar signals received from another device through a signal transfer link 713 and/or a power transfer link 785. The control engine 706 may include a printed circuit board, upon which the hardware processor 720 and/or one or more discrete components of the controller 790 are positioned.

In certain embodiments, the control engine 706 of the controller 790 can communicate with one or more components of a system external to the system 700 in furtherance of optimizing the performance of the energy storage unit 736 (or portions thereof). For example, the control engine 706 can interact with an inventory management system by ordering a component (e.g., an energy storage device 793) of the energy storage unit 736 to replace a component of the energy storage unit 736 that the control engine 706 has determined to fail or be failing. As another example, the control engine 706 can interact with a workforce scheduling system by scheduling a maintenance crew to repair or replace the energy storage unit 736 (or component thereof) when the control engine 706 determines that the energy storage unit 736 (or component thereof) requires maintenance or replacement. In this way, the controller 790 is capable of performing a number of functions beyond what could reasonably be considered a routine task.

In certain example embodiments, the control engine 706 can include an interface that enables the control engine 706 to communicate with one or more components (e.g., a power supply 740, the electrical load 775) of the system 700. For example, if a power supply 740 operates under IEC Standard 62386, then the power supply 740 can have a serial communication interface that will transfer data (e.g., stored data 734) measured by the sensors 760. In such a case, the control engine 706 can also include a serial interface to enable communication with the power supply 740. Such an interface can operate in conjunction with, or independently of, the protocols 732 used to communicate between the controller 790 and the user 750, the network manager 780, and the sensors 760.

The control engine 706 (or other components of the controller 790) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 708 of the controller 790 determines and implements the communication protocol (e.g., from the protocols 732 of the storage repository 730) that is used when the control engine 706 communicates with (e.g., sends signals to, receives signals from) the user 750, the network manager 780, and/or one or more of the sensors 760. In some cases, the communication module 708 accesses the stored data 734 to determine which communication protocol is used to communicate with the user 750, the network manager 780, and/or a sensor 760 associated with the stored data 734. In addition, the communication module 708 can interpret the communication protocol of a communication received by the controller 790 so that the control engine 706 can interpret the communication.

The communication module 708 can send and receive data between the network manager 780, the sensors 760, and/or the users 750 and the controller 790. The communication module 708 can send and/or receive data in a given format that follows a particular protocol 732. The control engine 706 can interpret the data packet received from the communication module 708 using the protocol 732 information stored in the storage repository 730. The control engine 706 can also facilitate the data transfer between one or more sensors 760 and the network manager 780 or a user 750 by converting the data into a format understood by the communication module 708.

The communication module 708 can send data (e.g., protocols 732, algorithms 733, stored data 734, operational information, alarms) directly to and/or retrieve data directly from the storage repository 730. Alternatively, the control engine 706 can facilitate the transfer of data between the communication module 708 and the storage repository 730. The communication module 708 can also provide encryption to data that is sent by the controller 790 and decryption to data that is received by the controller 790. The communication module 708 can also provide one or more of a number of other services with respect to data sent from and received by the controller 790. Such services can include, but are not limited to, data packet routing information and procedures to follow in the event of data interruption.

The timer 710 of the controller 790 can track clock time, intervals of time, an amount of time, and/or any other measure of time. The timer 710 can also count the number of occurrences of an event, whether with or without respect to time. Alternatively, the control engine 706 can perform the counting function. The timer 710 is able to track multiple time measurements concurrently. The timer 710 can track time periods based on an instruction received from the control engine 706, based on an instruction received from the user 750, based on an instruction programmed in the software for the controller 790, based on some other condition or from some other component, or from any combination thereof.

The timer 710 can be configured to track time when there is no power delivered to the controller 790 (e.g., the power module 712 malfunctions) using, for example, a super capacitor or a battery backup. In such a case, when there is a resumption of power delivery to the controller 790, the timer 710 can communicate any aspect of time to the controller 790. In such a case, the timer 710 can include one or more of a number of components (e.g., a super capacitor, an integrated circuit) to perform these functions.

The energy metering module 739 of the controller 790 measures one or more components of power (e.g., current, voltage, resistance, VARs, watts) at one or more points (e.g., input of each energy storage device 793) associated with the energy storage unit 736. The energy metering module 739 can include any of a number of measuring devices and related devices, including but not limited to a voltmeter, an ammeter, a power meter, an ohmmeter, a current transformer, a potential transformer, and electrical wiring. The energy metering module 739 can measure a component of power continuously, periodically, based on the occurrence of an event, based on a command received from the control module 706, and/or based on some other factor. The energy metering module 739 can be a type of sensor 760.

The power module 712 of the controller 790 provides power to one or more other components (e.g., timer 710, control engine 706) of the controller 790. In certain example embodiments, the power module 712 receives power from the power supply 740. Alternatively, as when the power module 712 includes an independent source of power, the power module 712 can provide power to the power supply 740. The power module 712 can have one or more similarities to the power supply 740. For example, the power module 712 can include one or more of a number of single or multiple discrete components (e.g., transistor, diode, resistor), and/or a microprocessor. The power module 712 may include a printed circuit board, upon which the microprocessor and/or one or more discrete components are positioned. In some cases, the power module 712 can include one or more components that allow the power module 712 to measure one or more elements of power (e.g., voltage, current) that is delivered to and/or sent from the power module 712. Alternatively, the energy metering module 739 can measure such elements of power.

The power module 712 can include one or more components (e.g., a transformer, a diode bridge, an inverter, a converter) that receives power (for example, through an electrical cable) from a source external to the energy storage unit 736 and generates power of a type (e.g., AC, DC) and level (e.g., 12V, 24V, 720V) that can be used by the other components of the controller 790 and/or by the power supply 740. The power module 712 can use a closed control loop to maintain a preconfigured voltage or current with a tight tolerance at the output. The power module 712 can also protect the rest of the electronics (e.g., hardware processor 720, transceiver 724) in the energy storage unit 736 from surges generated in the line.

In addition, or in the alternative, the power module 712 can be a source of power in itself to provide signals to the other components of the controller 790 and/or the power supply 740. For example, the power module 712 can be or include a battery or other form of energy storage device. As another example, the power module 712 can be a localized photovoltaic power system. The power module 712 can also have sufficient isolation in the associated components of the power module 712 (e.g., transformers, opto-couplers, current and voltage limiting devices) so that the power module 712 is certified to provide power to an intrinsically safe circuit.

In certain example embodiments, the power module 712 of the controller 790 can also provide power and/or control signals, directly or indirectly, to one or more of the sensors 760. In such a case, the control engine 706 can direct the power generated by the power module 712 to the sensors 760 and/or the power supply 740. In this way, power can be conserved by sending power to the sensors 760 and/or the power supply 740 when those devices need power, as determined by the control engine 706. In alternative cases, the control engine 706 directs primary power from the power supply 740 to the power module 712.

The hardware processor 720 of the controller 790 executes software, algorithms, and firmware in accordance with one or more example embodiments. Specifically, the hardware processor 720 can execute software on the control engine 706 or any other portion of the controller 790, as well as software used by the user 750, the network manager 780, and/or one or more of the sensors 760. The hardware processor 720 can be an integrated circuit, a central processing unit, a multi-core processing chip, SoC, a multi-chip module including multiple multi-core processing chips, or other hardware processor in one or more example embodiments. The hardware processor 720 is known by other names, including but not limited to a computer processor, a microprocessor, and a multi-core processor.

In one or more example embodiments, the hardware processor 720 executes software instructions stored in memory 722. The memory 722 includes one or more cache memories, main memory, and/or any other suitable type of memory. The memory 722 can include volatile and/or non-volatile memory. The memory 722 is discretely located within the controller 790 relative to the hardware processor 720 according to some example embodiments. In certain configurations, the memory 722 can be integrated with the hardware processor 720.

In certain example embodiments, the controller 790 does not include a hardware processor 720. In such a case, the controller 790 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 790 (or portions thereof) to be programmable and function according to certain logic rules and thresholds without the use of a hardware processor. Alternatively, FPGAs, IGBTs, ICs, and/or similar devices can be used in conjunction with one or more hardware processors 720.

The transceiver 724 of the controller 790 can send and/or receive control and/or communication signals. Specifically, the transceiver 724 can be used to transfer data between the controller 790 and the user 750, the network manager 780, and/or the sensors 760. The transceiver 724 can use wired and/or wireless technology. The transceiver 724 can be configured in such a way that the control and/or communication signals sent and/or received by the transceiver 724 can be received and/or sent by another transceiver that is part of the user 750, the network manager 780, and/or the sensors 760. The transceiver 724 can use any of a number of signal types, including but not limited to radio signals.

When the transceiver 724 uses wireless technology, any type of wireless technology can be used by the transceiver 724 in sending and receiving signals. Such wireless technology can include, but is not limited to, Wi-Fi, visible light communication, cellular networking, and Bluetooth. The transceiver 724 can use one or more of any number of suitable communication protocols (e.g., ISA100, HART) when sending and/or receiving signals. Such communication protocols can be stored in the communication protocols 732 of the storage repository 730. Further, any transceiver information for the user 750, the network manager 780, and/or the sensors 760 can be part of the stored data 734 (or similar areas) of the storage repository 730.

Optionally, in one or more example embodiments, the security module 728 secures interactions between the controller 790, the user 750, the network manager 780, and/or the sensors 760. More specifically, the security module 728 authenticates communication from software based on security keys verifying the identity of the source of the communication. For example, user software may be associated with a security key enabling the software of the user 750 to interact with the controller 790 and/or the sensors 760. Further, the security module 728 can restrict receipt of information, requests for information, and/or access to information in some example embodiments.

As mentioned above, aside from energy storage unit 736 and its components, the light fixture 709 can include the sensors 760 and the electrical load 775. The electrical load 775 can be substantially similar to the electrical load (e.g., electrical load 175) discussed above. For example, in the case of the light fixture 709 of FIG. 7A, the electrical load 795 can include an array of one or more light sources. If an electrical load 775 has multiple light sources, those light sources can be arranged in series and/or in parallel with respect to each other. Further, when a light fixture 709 has multiple electrical loads 775, the multiple electrical loads 775 can be arranged in series and/or in parallel with respect to each other.

Each electrical load 775 of the light fixture 709 can include devices and/or components typically found in a light fixture to allow the light fixture 709 to operate. Examples of such devices and/or components of an electrical load 775 can include, but are not limited to, a light source, a local control module, a light engine, a heat sink, an electrical conductor or electrical cable, a light array, a terminal block, a lens, a diffuser, a reflector, an air moving device, a baffle, a dimmer, and a circuit board. The electrical load 775 can include any type of lighting technology, including but not limited to LED, incandescent, sodium vapor, and fluorescent.

The power supply 740 can be substantially the same as the power supplies (e.g., power supply 140) described above. In this case, the power supply 740 provides power to the light fixture 709 and its various components. The power supply 740 can be called any of a number of other names, including but not limited to a driver, a LED driver, and a ballast. The power supply 740 can be substantially the same as, or different than, the power module 712 of the controller 790. The power supply 740 can include one or more of a number of single or multiple discrete components (e.g., transistor, diode, resistor), and/or a microprocessor. The power supply 740 may include a printed circuit board, upon which the microprocessor and/or one or more discrete components are positioned, and/or a dimmer.

A power supply 740 can include one or more components (e.g., a transformer, a diode bridge, an inverter, a converter) that receives power (for example, through an electrical cable) from the power module 712 of the controller 790 and generates power of a type (e.g., AC, DC) and level (e.g., 12V, 24V, 720V) that can be used by the electrical load 775. In addition, or in the alternative, the power supply 740 can receive power from a source external to the light fixture 709. In addition, or in the alternative, the power supply 740 can be a source of power in itself. For example, the power supply 740 can be a battery, a localized photovoltaic power system, or some other source of independent power.

As shown in FIG. 7A, one or more of the switches 794 determine which energy storage devices 793 receive primary power from the power supply 740 at any particular point in time. Additionally, in some cases, one or more of the switches 794 can be used to determine when reserve power is provided by the energy storage unit 736 to the electrical load 775. A switch 794 has an open state and a closed state (position). In the open state, the switch 794 creates an open circuit, which prevents the power supply 740 from delivering power to one or more of the energy storage devices 793. In the closed state, the switch 794 creates a closed circuit, which allows the power supply 740 to deliver power to one or more of the energy storage devices 793. In certain example embodiments, the position of each switch 794 is controlled by the control engine 706 of the controller 790.

Each switch 794 can be substantially the same as the switches (e.g., switch 194, switch 394) described above. For example, a switch 794 can be any type of device that changes state or position (e.g., opens, closes) based on certain conditions. Examples of a switch 794 can include, but are not limited to, a transistor (e.g., a field-effect transistor (FET)), a dipole switch, a relay contact, a resistor, and a NOR gate. In certain example embodiments, each switch 794 can operate (e.g., change from a closed position to an open position, change from an open position to a closed position) based on input from the controller 790.

As stated above, the light fixture 709 (and so also the energy storage unit 736) can be placed in any of a number of environments. In such a case, the housing 703 of the energy storage unit can be configured to comply with applicable standards for any of a number of environments. For example, the energy storage unit can be rated as a Division 1 or a Division 2 enclosure under NEC standards. Similarly, any of the sensors 760 or other devices communicably coupled to the energy storage unit can be configured to comply with applicable standards for any of a number of environments. For example, a sensor 760 can be rated as a Division 1 or a Division 2 enclosure under NEC standards Example embodiments can provide for efficient charging of energy storage devices during normal operating conditions (when a power supply provides primary power). Example embodiments can meet any applicable standards (e.g., for reliability, for energy conservation) for energy storage devices. Further, example embodiments can be designed for more efficient use of materials and less expensive components to deliver the same amount of reliability during times when a main source of power is unavailable (e.g., during emergency conditions). Example embodiments can more efficiently utilize components within an electrical circuit, thus extending the useful life of those components. Example embodiments can be used in retrofit applications of existing circuitry or as part of a new installation.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An electrical circuit comprising:
   a power supply that provides primary power, wherein the power supply comprises a constant voltage-constant current converter, and wherein the primary power is direct current;
   an electrical load coupled to the power supply, wherein the electrical load operates, at least in part, using the primary power; and
   an energy storage unit coupled to the power supply and the electrical load, wherein the energy storage unit comprises:
      at least one energy storage device that stores reserve power using the primary power;
      a first switch disposed between the power supply and the at least one energy storage device, wherein the first switch has an open position and a closed position;
      a timer that measures a first amount of time estimated to be when the at least one energy storage device is fully charged; and
      a controller that iteratively operates the first switch, independent of measured current and measured voltage, between the closed position and the open position after the first amount of time, as measured by the timer, has elapsed to allow for a pulse charge of the primary power to be delivered to the at least one energy storage device,
      wherein the at least one energy storage device receives the primary power without conversion from the power supply through the first switch when the first switch is in the closed position, and
      wherein the at least one energy storage device fails to receive the primary power when the first switch is in the open position.

2. The electrical circuit of claim 1, wherein the first amount of time begins when the at least one energy storage device stops delivering the reserve power to the electrical load.

3. The electrical circuit of claim 2, wherein the timer is part of the controller.

4. The electrical circuit of claim 1, wherein the controller, after the first amount of time has elapsed and while continuing to receive the primary power from the power supply, regulates the pulse charge by controlling a frequency of the primary power.

5. The electrical circuit of claim 4, wherein the primary power has a square wave when the controller operates the first switch based on the frequency of the primary power.

6. The electrical circuit of claim 1, wherein the controller, after the first amount of time has elapsed and while continuing to receive the primary power from the power supply, regulates the pulse charge by controlling a duty cycle of the first switch, wherein the duty cycle of the first switch is based on a maximum maintenance mode power, a full load efficiency of the power supply, and a housekeeping load efficiency of the power supply.

7. The electrical circuit of claim 6, wherein the duty cycle causes a charge rate of the at least one energy storage device to be greater than a discharge rate of the at least one energy storage device.

8. The electrical circuit of claim 1, wherein the energy storage unit discharges the reserve power to the electrical load when the power supply stops providing the primary power.

9. The electrical circuit of claim 1, wherein the first amount of time is approximately 24 hours.

10. The electrical circuit of claim 1, wherein the at least one energy storage device comprises at least one nickel-cadmium battery.

11. The electrical circuit of claim 1, wherein the first switch comprises a field-effect transistor.

12. The electrical circuit of claim 11, wherein the field-effect transistor comprises a n-channel metal-oxide semiconductor field effect transistor.

13. The electrical circuit of claim 1, wherein the first switch comprises a bipolar junction transistor.

14. The electrical circuit of claim 1, wherein the energy storage unit further comprises a second switch disposed between the at least one energy storage device and the electrical load, wherein the controller operates the second switch when delivery of the primary power from the power supply is interrupted.

15. The electrical circuit of claim 14, wherein operating the second switch allows the energy storage unit to deliver the reserve power to the electrical load.

16. A controller for an energy storage unit, the controller comprising:
   a control engine that follows a plurality of instructions to:
      maintain a switch in a closed position for a first period of time measured by a timer coupled to the control engine, wherein the switch is configured to be disposed between a power supply and at least one energy storage device of the energy storage unit, wherein the power supply provides primary power without conversion through the switch to the at least one energy storage device during the first period of time, wherein the power supply comprises a constant voltage-constant current converter, and wherein the primary power is direct current;
      operate the switch, when the first period of time has expired, as measured by the timer, and independent of measured current and measured voltage, from the closed position to an open position for a second period of time measured by the timer, wherein the energy storage unit fails to receive the primary power during the second period of time;
      operate the switch, when the second period of time has expired, as measured by the timer, and independent of the measured current and the measured voltage, from the open position to the closed position, wherein the energy storage unit resumes receiving the primary power as a pulse charge after the second period of time has expired; and
      iteratively continue to operate the switch, independent of the measured current and the measured voltage, between the open position and the closed position to allow for the pulse charge of the primary power to the at least one energy storage device while the power supply continues to deliver the primary power.

17. The controller of claim 16, further comprising:
a memory that stores the plurality of instructions; and
a hardware processor that executes the plurality of instructions for the control engine.

18. The controller of claim 17, wherein the plurality of instructions comprises instructions to control a frequency of the pulse charge.

* * * * *